(12) United States Patent (10) Patent No.: US 8,875,042 B2
Lejeune et al. (45) Date of Patent: Oct. 28, 2014

(54) SYSTEM AND METHOD OF NAVIGATING THROUGH NOTIFICATIONS

(75) Inventors: Jeffrey David Lejeune, Kitchener (CA); Andrew Douglas Bocking, Waterloo (CA); Alen Mujkic, Mississauga (CA); Thanh Vinh Vuong, Kitchener (CA)

(73) Assignee: BlackBerry Limited, Waterloo (CA)

( * ) Notice: Subject to any disclaimer, the term of this patent is extended or adjusted under 35 U.S.C. 154(b) by 1258 days.

(21) Appl. No.: 12/040,164

(22) Filed: Feb. 29, 2008

(65) Prior Publication Data

US 2009/0222748 A1  Sep. 3, 2009

(51) Int. Cl.
G06F 3/00 (2006.01)
G06F 1/16 (2006.01)
H04M 1/725 (2006.01)

(52) U.S. Cl.
CPC .............. *G06F 1/169* (2013.01); *G06F 1/1616* (2013.01); *H04M 2250/16* (2013.01); *H04M 1/72552* (2013.01); *G06F 1/1686* (2013.01); *G06F 1/165* (2013.01)
USPC ............................ 715/772; 715/864; 715/764

(58) Field of Classification Search
CPC ................................. G06F 8/34; G06F 3/0481
USPC .......... 345/155–184, 418–475, 521; 715/764, 715/771, 772
See application file for complete search history.

(56) References Cited

U.S. PATENT DOCUMENTS

| | | | |
|---|---|---|---|
| 6,907,276 B2 * | 6/2005 | Toba | 455/566 |
| 7,213,210 B2 * | 5/2007 | Reysa | 715/752 |
| 7,982,598 B2 * | 7/2011 | Bonansea et al. | 340/539.11 |
| 7,996,045 B1 * | 8/2011 | Bauer et al. | 455/566 |
| 2002/0037754 A1 | 3/2002 | Hama et al. | |
| 2002/0094826 A1 * | 7/2002 | Lee | 455/457 |
| 2004/0061716 A1 * | 4/2004 | Cheung et al. | 345/710 |
| 2004/0210587 A1 * | 10/2004 | Reysa | 707/100 |
| 2007/0008239 A1 * | 1/2007 | Stroupe et al. | 345/1.1 |
| 2008/0272907 A1 * | 11/2008 | Bonansea et al. | 340/539.11 |
| 2009/0182824 A1 * | 7/2009 | Haynes et al. | 709/206 |
| 2011/0029870 A1 * | 2/2011 | May et al. | 715/710 |

FOREIGN PATENT DOCUMENTS

| | | |
|---|---|---|
| EP | 1244275 | 9/2002 |
| EP | 1379062 | 1/2004 |
| EP | 1379062 A2 * | 1/2004 |
| EP | 1408673 | 4/2004 |

(Continued)

OTHER PUBLICATIONS

Danny Brogan, Second Coming, www.mobilechoiceuk.com, 1 page.

(Continued)

*Primary Examiner* — Ryan Pitaro
(74) *Attorney, Agent, or Firm* — Ridout & Maybee LLP

(57) ABSTRACT

A method for navigating through notifications on a wireless device having a primary user interface shown on a primary display and a secondary user interface shown on a secondary display, the method comprising the steps of: generating a notification at the wireless device, the notification being associated with an event; detecting if the secondary user interface is being shown; indicating the notification on the secondary user interface if the secondary user interface is being shown; displaying a preview of the event on the secondary user interface in response to a selection of the notification in a preview mode; and closing the preview of the event on the secondary user interface in response to a deselection of the notification and bringing the secondary user interface out of the preview mode; wherein the notification is still maintained after displaying the preview of the associated event.

26 Claims, 9 Drawing Sheets

(56) References Cited

FOREIGN PATENT DOCUMENTS

| EP | 1583331 | 10/2005 |
| GB | 2358758 | 8/2001 |
| GB | 2407186 | 4/2005 |
| WO | WO 2006136655 | 12/2006 |

OTHER PUBLICATIONS

Rob Kerr, O2 Has an Alarming Phone, www.theinquirer.net, Sep. 3, 2007, 7 pages.
Danny Brogan, Second Coming, Mobile Choice, 1 page, 2007.
Nokia N71 review: A matter of taste—GSMArena.com, http://www.gsmarena.com/nokia_n71-review-92p2.php, 2 pages.
AT & T 3125 Smartphone reviews—CNET Reviews, http://reviews.cnet.com/smart-phones/at-t-3125/4505-6452_7-32001887.html, Reviewed by Bonnie Chaon, Sep. 13, 2006, 4 pages.
New Versions of Motorola's Razr and Q fail to excite, Associated Press Newswires, Sep. 12, 2007.
Extended European Search Report, EP10170509.3, dated Mar. 1, 2011.
Partial European Search Report, EP10172481.3, dated Apr. 14, 2011.
Office Action dated May 15, 2013 for corresponding European Patent Application No. 11193823.9.

* cited by examiner

SYSTEM AND METHOD OF NAVIGATING THROUGH NOTIFICATIONS

TECHNICAL FIELD

The present disclosure relates generally to mobile communication devices, and more particularly to a system and method of navigating through notifications on a mobile communication device.

BACKGROUND

Mobile communication devices may have multiple screens or displays. An example of such devices is a clamshell mobile communication device. A clamshell mobile communication device generally has a base and a hinged or sliding lid that can be closed over the base. Such devices generally provide a user with a primary display inside the lid or on the base that is visible when the device is open and provides the user with a user interface. Furthermore, some clamshell devices have a secondary display on the outside of the lid that is visible when the device is closed and provides the user with a secondary user interface. The secondary user interface may provide the user with such information as the device status, or notifications.

Notifications are generally associated with an event such as an incoming text message, an incoming email, or an upcoming calendar event, and usually indicate unacknowledged or newly occurred events. When the user sees the notification on the secondary display, the user has the option of opening the device and activating a related application to view the event immediately, or to leave the device closed and view the event later. However, the user typically does not know whether the event requires immediate attention or whether it can wait. Thus, the user may have to open the device and activate the related application every time a notification appears, or risk missing an urgent event. This may result in a lot of unnecessary opening of the device and activating of applications, which can be frustrating to the user, and may be a waste of device resources, such as computing and battery power.

One solution is to allow the user to open and acknowledge, delete, dismiss, or otherwise act on notifications and associated events using the secondary user interface on the secondary display, without having to open the device. However, this may lead to another problem. The user may carry the closed device in a pocket or a purse. Jostling of the device against the user or other objects in the pocket or purse may result in unintentional activation of buttons on the device. This may cause unintentional execution of applications, such as unintentional phone calls or messaging, or unintentional dismissal or deletion of events or notifications. This may be frustrating to the user as well as the recipient of such unintentional messages, and is particularly undesirable if an important event or notification is unintentionally dismissed or deleted.

BRIEF DESCRIPTION OF THE DRAWINGS

Reference will now be made to the drawings, which show by way of example embodiments of the present disclosure, and in which.

It will be noted that throughout the appended drawings, like features are identified by like reference numerals.

DETAILED DESCRIPTION

Figure 1:
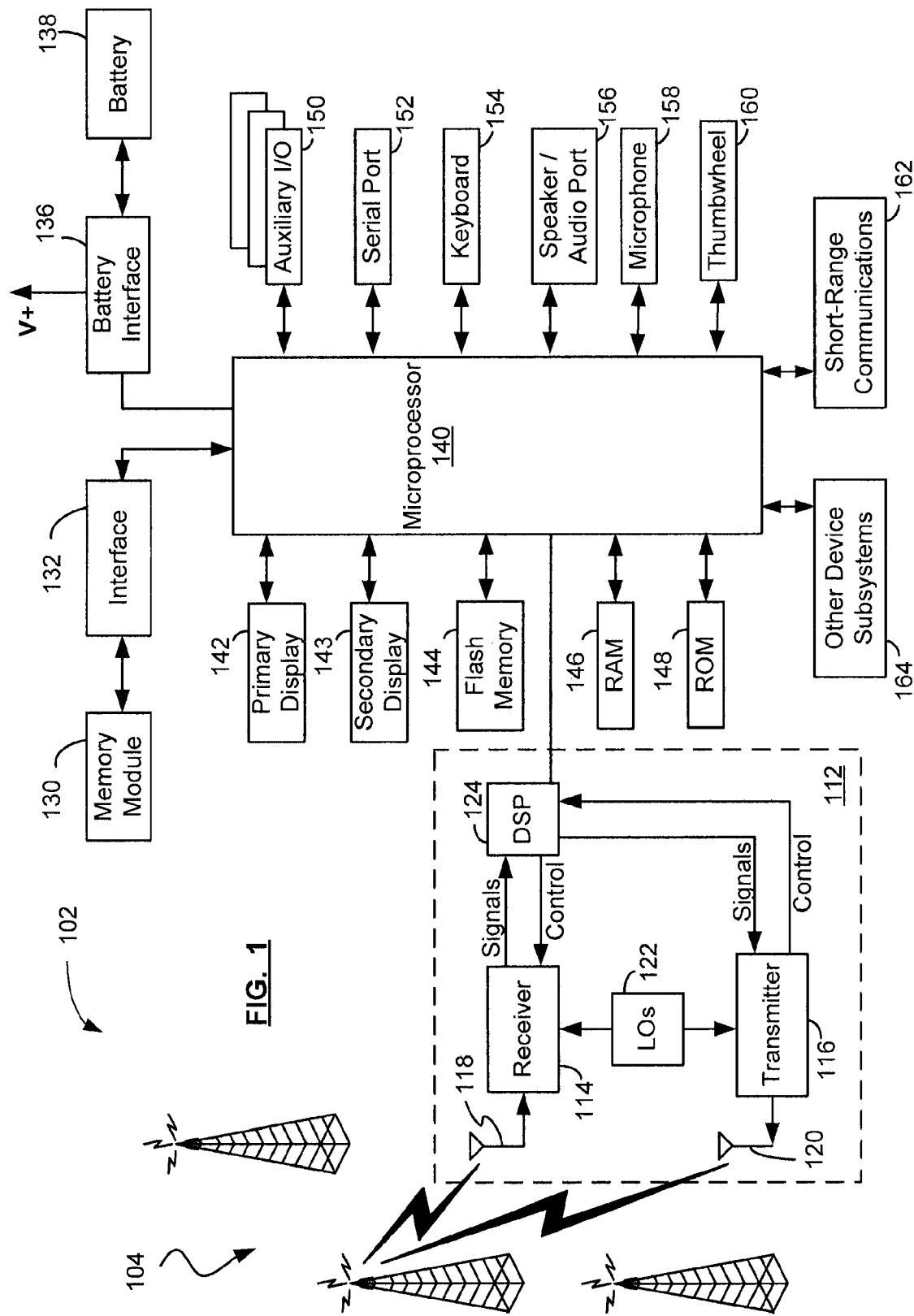
FIG. 1 shows in block diagram form a wireless device suitable for providing notification of events in accordance with an embodiment.

In some aspects there is provided a method for navigating through notifications on a wireless device having a primary user interface shown on a primary display and a secondary user interface shown on a secondary display, the method comprising the steps of: generating a notification at the wireless device, the notification being associated with an event; detecting if the secondary user interface is being shown; indicating the notification on the secondary user interface if the secondary user interface is being shown; displaying a preview of the event on the secondary user interface in a preview mode, in response to a selection of the notification; and closing the preview of the event on the secondary user interface in response to a deselection of the notification and bringing the secondary user interface out of the preview mode; wherein the notification is still maintained after displaying the preview of the associated event.

In some aspects there is provided a wireless device for navigating through notifications, the wireless device comprising: a microprocessor for controlling the operation of the wireless device; a first input device coupled to the microprocessor for accepting an input; a first display device for showing a primary user interface and a second display device for showing a secondary user interface, the first display device and the second display device being coupled to the microprocessor for communicating an output to the user; a communications subsystem coupled to the microprocessor for communicating with a communications network; a memory coupled to the microprocessor; and a storage device coupled to the microprocessor; the wireless device including a notification handling module resident in the memory for execution by the microprocessor, the notification handling module being configured to: generate a notification at the wireless device, the notification being associated with an event; detect if the secondary user interface is being shown; indicate the notification on the secondary user interface if the secondary user interface is being shown; display a preview of the event on the secondary user interface in a preview mode, in response to a selection of the notification; and close the preview of the event on the secondary user interface in response to a deselection of the notification and bringing the secondary user interface out of the preview mode; wherein the notification is still maintained after displaying the preview of the associated event.

In some aspects there is provided a computer program product having a computer readable medium tangibly embodying code for navigating through notifications in a mobile communication device, the device having a primary user interface shown on a primary display and a secondary user interface shown on a secondary display, the computer program product comprising: code for generating a notification at the wireless device, the notification being associated with an event; code for detecting if the secondary user interface is being shown; code for indicating the notification on the secondary user interface if the secondary user interface is being shown; code for displaying a preview of the event on the secondary user interface in a preview mode, in response to a selection of the notification; and code for closing the preview of the event on the secondary user interface in response to a deselection of the notification and bringing the secondary user interface out of the preview mode; wherein the notification is still maintained after displaying the preview of the associated event.

In some aspects there is provided a method of handling a notification on a wireless device having a primary user interface shown on a primary display and a secondary user interface shown on a secondary display, the method comprising the steps of: generating a notification at the wireless device, the notification being associated with an event; displaying the notification on the primary or secondary user interface; dismissing the notification after acknowledgement of the event; flagging the notification as an event reminder on the primary user interface; and redisplaying the notification as the event reminder on the secondary user interface.

In the method, wireless device, and computer program product described above, the event may be associated with a contact and the notification may be displayed in association with the contact.

In the method, wireless device, and computer program product described above, the notifications may be associated with respective contacts, and an option may be provided to navigate among previews associated with a single contact while the secondary user interface is maintained in the preview mode.

Reference is first made to FIG. 1, which shows a block diagram illustrating a wireless device 102 suitable for navigating through notifications in accordance with an embodiment of the present disclosure. It will be understood that references to a wireless device in this disclosure may also refer to a wireless device with multiple screens or displays, a clamshell wireless device or to a clamshell mobile communication device. The teachings of this disclosure may be applicable to any wireless device having more than one display, and is not limited to clamshell devices. The wireless device 102 communicates through a wireless communication network 104. The wireless network 104 includes antennae, base stations, and supporting radio equipment as for supporting wireless communications between the wireless device 102 and other devices connected to wireless network 104. The wireless network 104 may be coupled to a wireless network gateway and to a wide area network, shown in FIG. 2.

In an embodiment, the wireless device 102 is a two-way mobile communication device having at least voice and data communication capabilities, including the capability to communicate with other computer systems. In an embodiment, the wireless device 102 is a clamshell handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), a clamshell device, or a flip-phone. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In an embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a Universal Subscriber Identity Module (USIM) card for use in a Universal Mobile Telecommunication System (UMTS). The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a primary display 142, a secondary display 143, a flash memory 144, a random access memory (RAM) 146, a read-only memory (ROM)

148, auxiliary input/output (I/O) subsystems 150, a data port such as serial port 152, a keyboard or keypad 154, a speaker or audio port 156 for connecting to, for example a set of headphones or an earpiece, a microphone 158, a clickable thumbwheel or thumbwheel 160, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the primary display 142, the secondary display 143, and the clickable thumbwheel 160, for example, may be used for both communication-related functions, such as displaying notifications or entering a text message for transmission over the wireless network 104, and executing device-resident functions such as a clock, a calculator or a task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards or mini SD cards, etc.

The PIM and/or media applications have the ability to send and receive data items via either the wireless network 104 or a link to a computer system. The link to the computer system may be via the serial port 152 or the short-range communications subsystem 162. In an embodiment, PIM and/or media data items are seamlessly combined, synchronized, and updated via the wireless network 104, with the wireless device user's corresponding data items stored and/or associated with a host computer system thereby creating a mirrored or partially mirrored host computer on the wireless device 102 with respect to such items. This may be advantageous where the host computer system is the wireless device user's office computer system. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the primary display 142, secondary display 143, or alternatively to the auxiliary I/O device 150. A user of the wireless device 102 may also compose data items, such as email messages, for example, using the keypad 154 and/or the clickable thumbwheel 160 in conjunction with the primary display 142 and possibly the auxiliary I/O device 150. The keypad 154 may be either a complete alphanumeric keypad or telephone-type keypad. These composed items may be transmitted through the communication subsystem 112 over the wireless network 104 or via the short range communication subsystem 162.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the primary display 142 or the secondary display 143 may also be used to provide an indication of the identity of a calling party, duration of a voice call, or other voice call related information. Stereo headphones or an earpiece may also be used in place of the speaker 156.

The serial port 152 is normally implemented in a personal digital assistant (PDA) type communication device for which synchronization with a user's computer is a desirable, albeit optional, component. The serial port 152 enables a user to set preferences through an external device or software application and extends the capabilities of the wireless device 102 by providing for information or software downloads to the wireless device 102 other than through the wireless network 104. The alternate download path may, for example, be used to load software or data files onto the wireless device 102 through a direct, reliable and trusted connection.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as one or more of 802.11b, 802.11g, or 802.11n.

Figure 2:
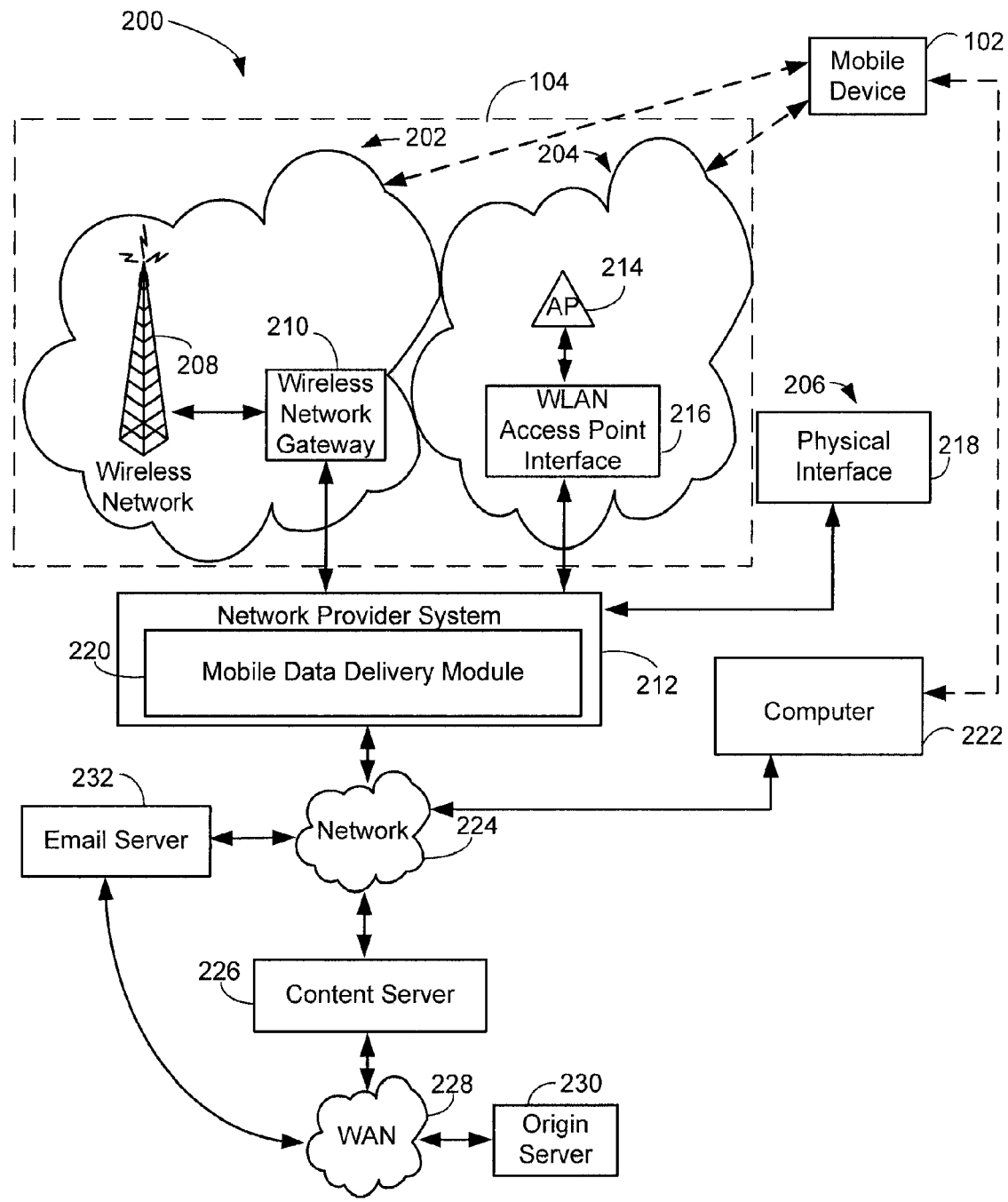
FIG. 2 shows in block diagram form a communication system suitable for providing the operating environment of the wireless device of FIG. 1 in accordance with an embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), or Evolution-Data Optimized (EV-DO).

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as one or more of 802.11b, 802.11g, or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to an embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In an embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 can be temporarily and directly connected to the computer 222 using, for example, the serial port 152. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to an embodiment, the mobile data delivery module 220 provides connectivity between the wireless WAN 202 and the WLAN 204 and the other connection 206 and devices and/or networks connected directly or indirectly to the network provider system 212. In an embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
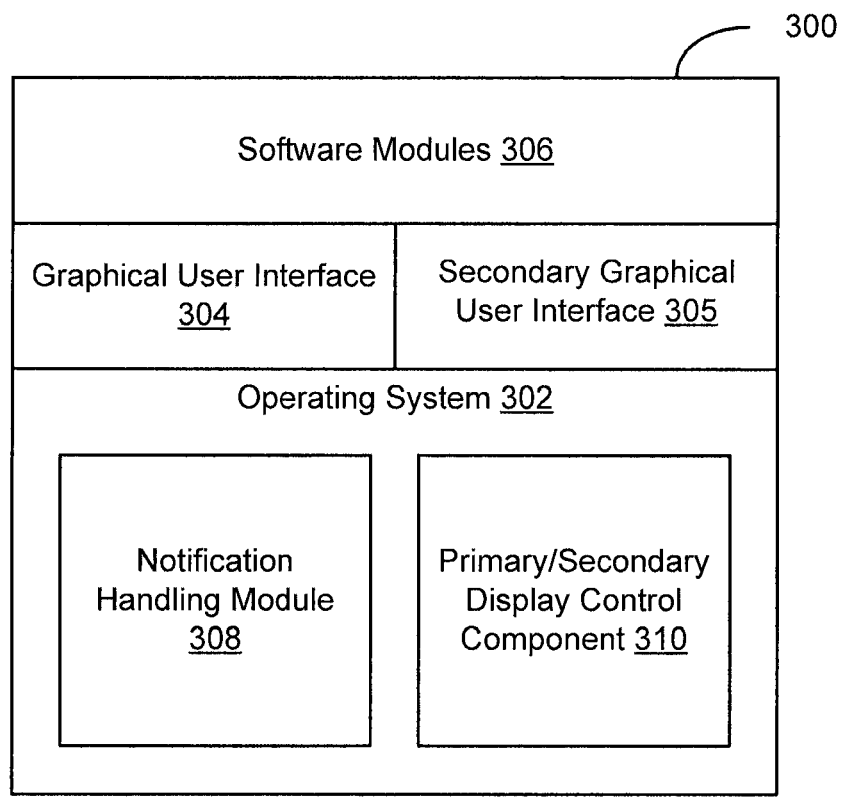
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with an embodiment, the wireless device 102 is intended to be a multi-tasking mobile communication device having multiple screens or displays for sending and receiving data items, such as instant messages, for making and receiving voice calls, and for creating events and alerts. To provide a user-friendly environment to control the operation of the wireless device 102, an operating system (OS) 302 resident on the wireless device 102 provides a basic set of operations for supporting various applications typically operable through a primary user interface such as a primary graphical user interface (GUI) 304, and may include a secondary user interface such as a secondary GUI 305 which may be displayed on the secondary display 143. Although the primary GUI 304 and the secondary GUI 305 are shown as separate components, the secondary GUI 305 may be a sub-component of the primary GUI 304.

The OS may comprise a notification handling module 308 for handling new and existing notifications. The OS may also comprise a primary/secondary display control component 310 for controlling the primary display 142 and the secondary display 143. For example, the operating system 302 provides basic input/output system features to obtain input from the auxiliary I/O 150, the keypad 154, the clickable thumbwheel 160, and other input devices, and to facilitate output to the user via at least one of the primary display 142 and the secondary display 143. The primary GUI 304 and the secondary GUI 305 are typically components of the OS 302. One or more software modules 306 for managing communications or providing a personal digital assistant (PDA) or other functions may also be included.

The memory 300 also includes an email and calendar client, which may be combined in, for example, a PIM application having email-based calendaring and scheduling functions. Typically, the PIM is installed as one of the software modules 306. The notification handling module 308 may be included among the software modules 306. Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied on a computer readable medium (such as a DVD, CD, floppy disk or other storage media) which may be used for transporting the programmed instructions to the memory 300 of the wireless device 102. Alternatively, the programmed instructions may be embedded in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4A:
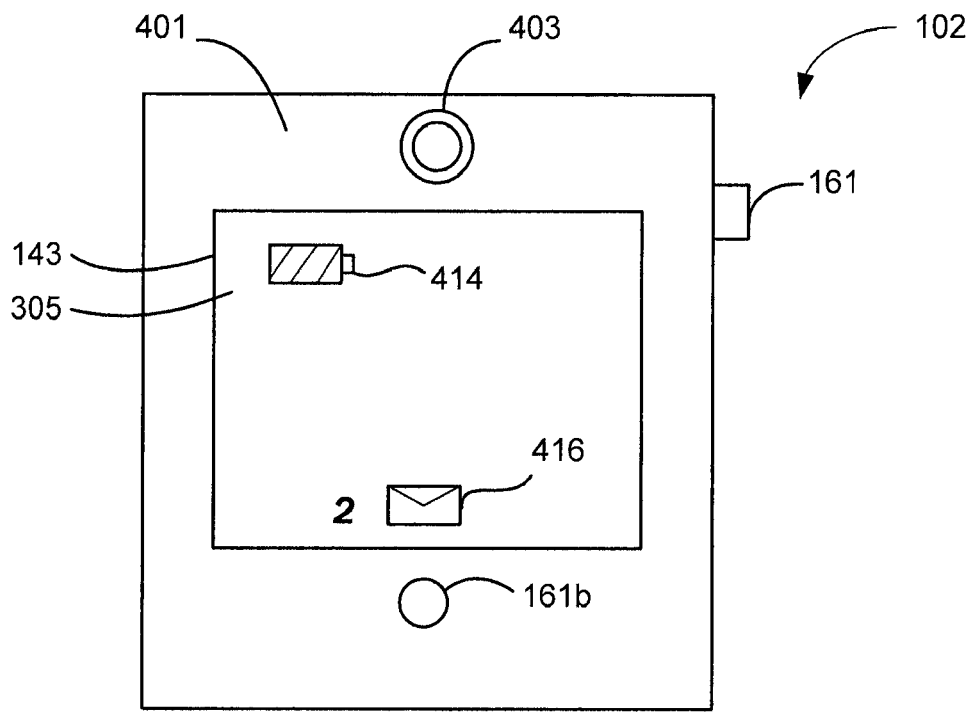
FIG. 4A is a front view illustrating an embodiment of the wireless device of FIG. 1 with a secondary user interface being shown in a closed configuration.
Figure 4B:
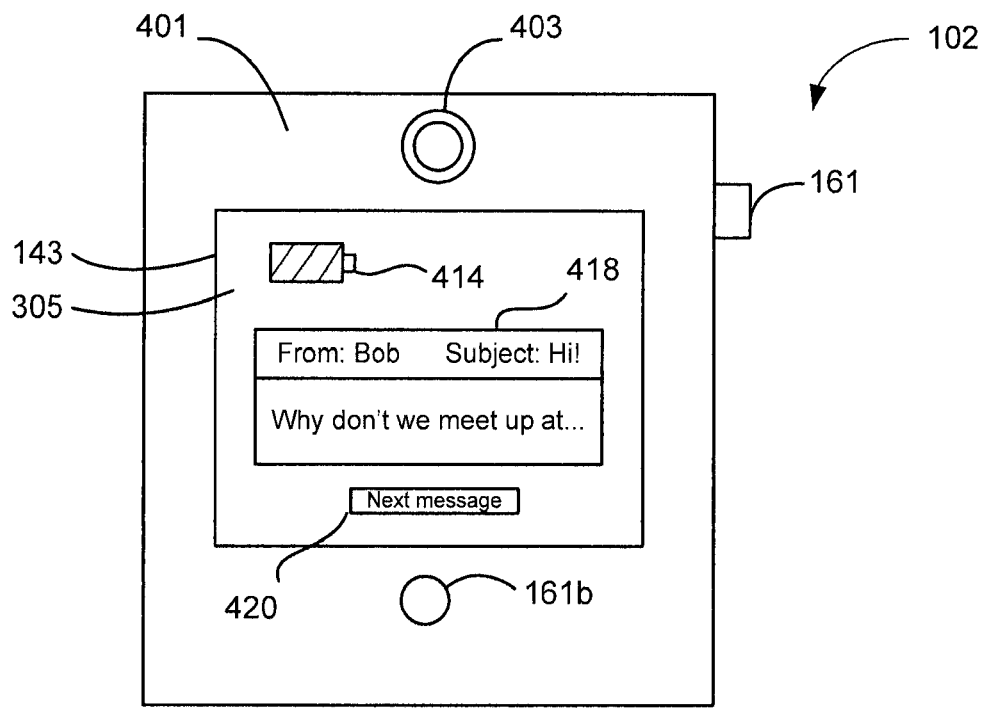
FIG. 4B is a front view illustrating the wireless device of FIG. 4A displaying a preview of an event.

Reference is next made to FIGS. 4A and 4B, which show a front view of an embodiment of a wireless device 102 in which the secondary GUI 305 is shown on the secondary display 143 when the wireless device 102 is in a closed configuration. In FIG. 4A, the secondary GUI 305 is in a base mode. In FIG. 4B, the secondary GUI 305 is in a preview mode. The base mode may refer to the user interface provided by the secondary GUI 305 during normal operation, whereas the preview mode may refer to the user interface provided by the secondary GUI 305 when previewing an event. While the preview mode refers to the secondary GUI 305 being in a mode where a preview of an event is being shown, the base mode refers to the secondary GUI 305 being in any other mode suitable for other user interactions. As such, the base mode may include different modes, functions or displays for the secondary GUI 305.

In the shown embodiment, the wireless device 102 is a clamshell mobile communication device. As mentioned above, the wireless device 102 may be a data and voice-enabled handheld device. The wireless device 102 includes the primary display 142 that may be visible when the wireless device 102 is in an opened configuration (FIG. 4C), and the secondary display 143 that may be visible when the wireless device 102 is in a closed configuration (FIGS. 4A and 4B). The term visible as used above is meant to say that the display may be viewable by the user looking at the front of the wireless device 102; however, the display may or may not be active or displaying the respective primary GUI 304 or secondary GUI 305 even when the display is not visible to the user. The primary display 142 may be off when the wireless device 102 is in the closed configuration in order to save battery power. Similarly, the secondary display 143 may be off when the wireless device 102 is in the opened configuration in order to save battery power, or the secondary display 143 may show a default image such as a background or a clock when the wireless device 102 is in the opened configuration.

Although the wireless device 102 is shown with only one of the primary display 142 or the secondary display 143 being visible at any time, the wireless device 102 may also be configured so that both the primary display 142 and the secondary display 143 may be visible at the same time. If both the primary display 142 and the secondary display 143 are visible at the same time, only one of the primary GUI 304 or the secondary GUI 305 may be shown on the respective display at any time, or user interactions may be limited to only one of the primary GUI 304 or the secondary GUI 305 at any time. The front view of the closed wireless device 102 shows a lid 401, having the secondary display 143. The lid 401 may also include secondary navigation tools such as a selection button 161 or a secondary trackball 161b, and a camera lens 403. The secondary display 143 typically displays the secondary GUI 305.

A user may interact with the wireless device 102 and its software modules 306 using the primary GUI 304 and the secondary GUI 305. The following description refers to the primary GUI 304 for simplicity, but all references to the primary GUI 304 are equally applicable to the secondary GUI 305. The primary GUI 304 is controlled by the operating system 302 (FIG. 3) and provides a display format providing information to the user, or enabling the user to choose commands, execute application programs, manage computer files, and perform other functions by selecting pictorial representations (i.e., icons), or selecting items from a menu through the use of an input or pointing device such as the clickable thumbwheel 160 or the keypad 154. Generally, the primary GUI 304 is used to convey information and receive commands from users and includes a variety of GUI objects or controls including icons, toolbars, drop-down menus, pop-up menus, text, dialog boxes, buttons, etc. A user typically interacts with the primary GUI 304 presented on the display 142 by using an input or pointing device to position a pointer or cursor 408 over an object 410 (i.e., "pointing" at the object) and by "clicking" on the object 410 (e.g., by depressing the thumbwheel 160 or a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable. The secondary GUI 305 may present a simplified user interface, and may provide limited user interaction compared to the primary GUI 304. For example, the secondary GUI 305 may allow user selection using the selection button 161 only, without a point-and-click interface.

Typically, a GUI-based system presents application, status, and other information to the user on the primary display 142 and the secondary display 143. The primary GUI 304 may provide for a full user interface whereas the secondary GUI 305 may provide a condensed or simplified user interface. For example, the primary GUI 304 may provide a window 412, which is a display area shown within the primary display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area. The secondary GUI 305 may also provide a window 412, or it may provide a simplified user interface without the use of a window 412.

The secondary GUI 305 may provide for simplified user interaction on the secondary display 143 when the wireless device 102 is closed. For example, the secondary GUI 305 may provide status information, such as a battery status 414, but may not provide for full applications to be displayed. A notification icon 416 may also be presented, alerting the user to a new or unacknowledged event, such as an incoming email, an incoming text message, an incoming phone call, an incoming multi-media message (MMS), an incoming instant message (IM), a voice mail notification, a task reminder, an upcoming calendar event, or an alarm event. The user may select a notification icon 416 using the selection button 161. Additional information may be presented on the secondary GUI 305, such as the current time, or other background icons. The simplified user interaction provided by the secondary GUI 305 may prevent unintentional activity when the wireless device 102 is closed.

When the secondary display 143 is visible and active, as shown in FIG. 4A, the secondary GUI 305 may be displayed in the base mode, showing status information such as a battery status 414, and one or more notification icons 416. Notification icons 416 may be associated with an event, such as an incoming message or an alarm. Navigation tools such as the selection button 161 or the secondary trackball 161*b* may be used to scroll through or select a notification icon 416. Although the selection button 161 may be used as a navigation tool for the secondary GUI 305, for example when the wireless device 102 is in the closed configuration, the selection button 161 may provide other functions, for example volume or camera control, when the wireless device 102 is in an opened configuration or when the primary GUI 304 is being shown. These other functions for the selection button 161 may be disabled when the wireless device 102 is in the closed configuration, when the secondary display 143 is inactive or not visible, or when the secondary GUI 305 is not being shown, to prevent unintentional activity.

When the secondary GUI 305 is shown and in the preview mode, as shown in FIG. 4B, the secondary GUI 305 may include a preview 418 about an event. The event may be associated with one of the notifications indicated by the notification icons 416. The preview 418 may contain applicable information about the event, such as the name or number of the sender, a picture, the title or subject of the event, the event type (e.g., indication whether it is a text message or a voicemail), or a portion of the contents of the event. The type and content of the information in the preview 418 may depend on the type of event being previewed, and may be customizable by the user. In the preview mode, the secondary GUI 305 may still include status information such as a battery status 414, or such status information may be obscured by the preview 418. The user may also be provided an option to proceed to a preview 418 of an event associated with another notification while remaining in the preview mode, for example by selecting a continue box 420 or by using the navigation tool. The previews 418 may be viewed in chronological order, with the event associated with the newest notification being previewed first.

Figure 4C:
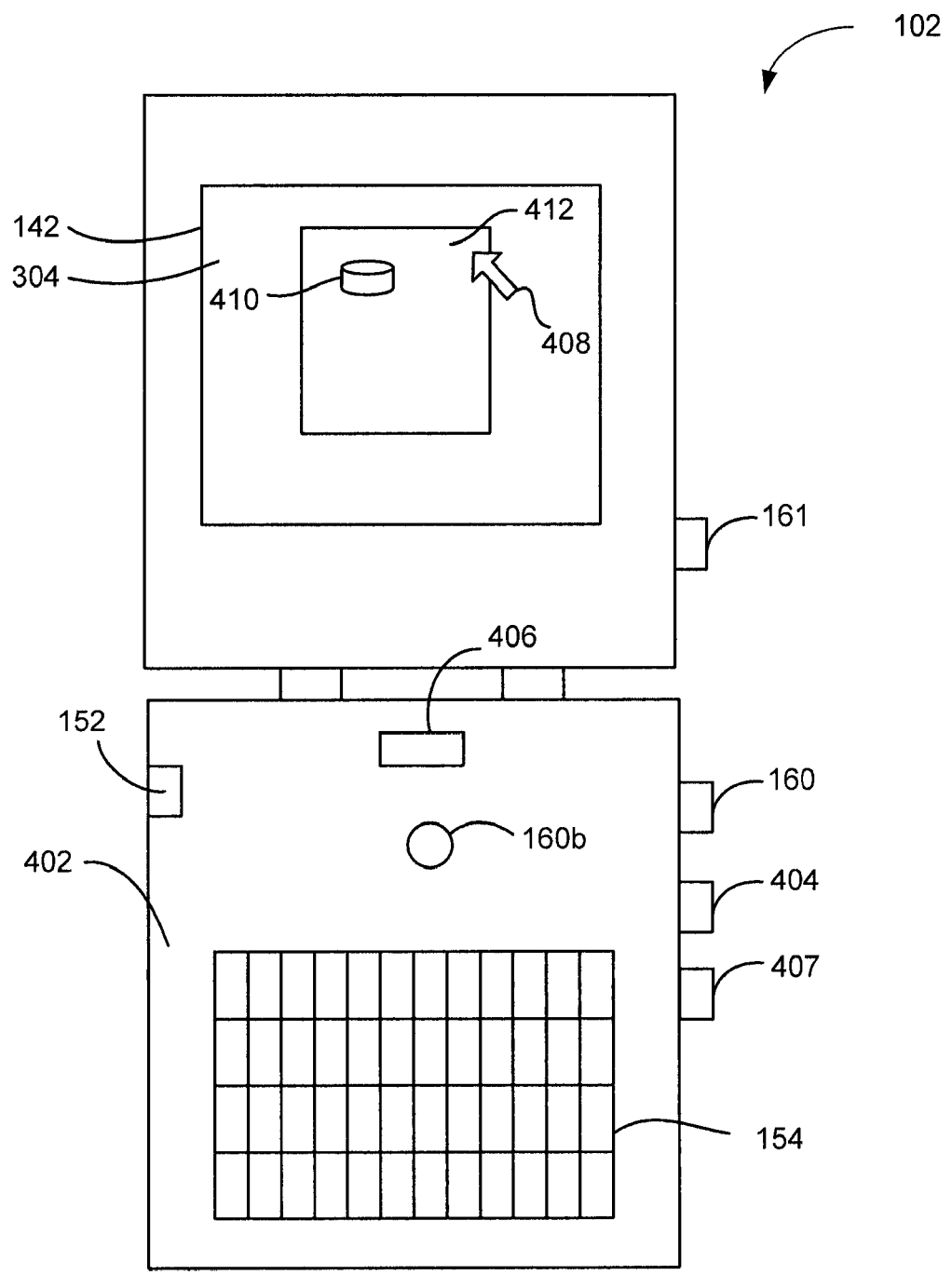
FIG. 4C is a front view illustrating the wireless device of FIG. 4A with a primary user interface being shown in an opened configuration.

Reference is next made to FIG. 4C, which shows a front view of the wireless device 102 of FIG. 4A with the primary display 142 being visible and active. The wireless device 102 includes a lower casing 402, the data or serial port 152, the primary display 142, which displays the primary GUI 304, the keypad 154, the clickable thumbwheel 160 or other device for navigation such as a trackball 160*b*, one or more input buttons 404 (e.g., select, cancel, talk buttons), signal inputs/outputs 406 (e.g., power connector input, microphone, speaker, data interface input, etc.), and an audio port 407. Although the wireless device 102 is shown with the primary display 142 being on the inside of the lid 401, the primary display 142 may also be on the lower casing 402 or in any other suitable location. Although the wireless device 102 is shown as having a selection button 161, the clickable thumbwheel 160 may be used instead, and all discussion of the selection button 161 will be understood to apply equally to the clickable thumbwheel 160. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the primary display 142, the secondary display 143, the clickable thumbwheel 160, etc.

The microprocessor 140 is typically coupled to one or more input devices (e.g., the buttons 404, the keypad 154, the clickable thumbwheel 160) for receiving user commands, selections or queries, and the primary display 142 and the secondary display 143 for displaying the results of these commands or queries. For example, user queries may be transformed into a combination of commands for producing one or more tables of output data which may be incorporated in one or more display pages for presentation to the user. In another example, user selections may be transformed into a command for displaying a preview of the selection on the primary display 142 or the secondary display 143. The microprocessor 140 is also coupled to the memory 300.

Although the wireless device 102 is shown as having a separate primary display 142 and secondary display 143 for showing the primary GUI 304 and the secondary GUI 305 respectively, it should be understood that a single display may instead be used. For example, the lid 401 may have an opening or a transparent portion through which a single display on the lower casing 402 is visible when the wireless device 102 is closed. Such a display may show the primary GUI 304 when the wireless device 102 is open, and may change to show the secondary GUI 305 when the wireless device 102 is closed. Other such variations would be possible.

Figure 5A:
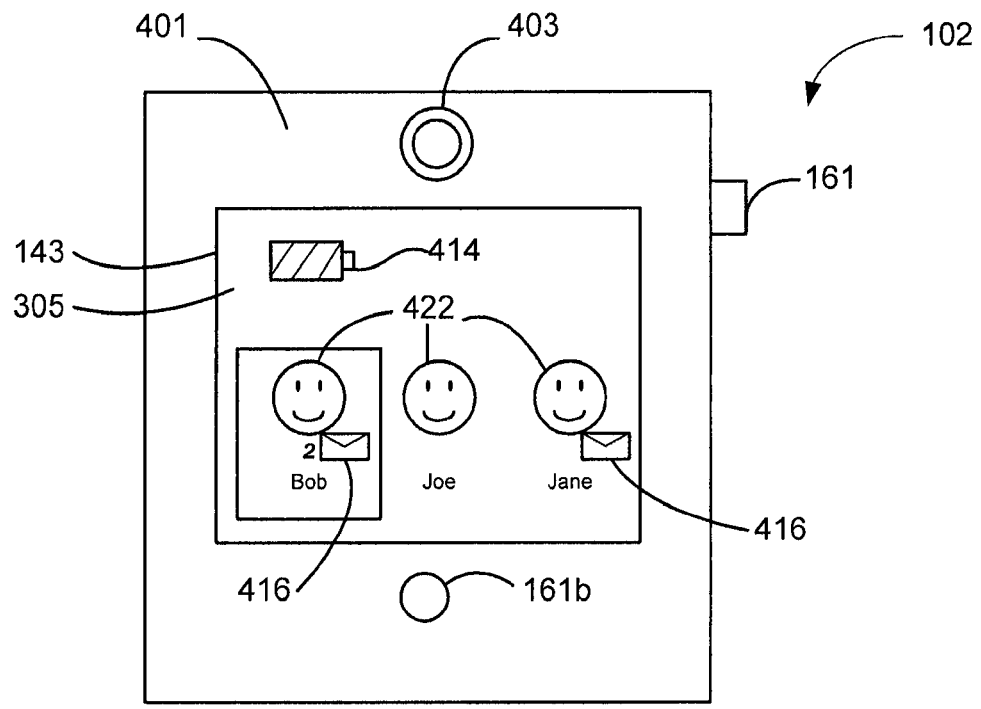
FIG. 5A is a front view illustrating another embodiment of the wireless device of FIG. 1 with a secondary user interface being shown in a closed configuration.
Figure 5B:
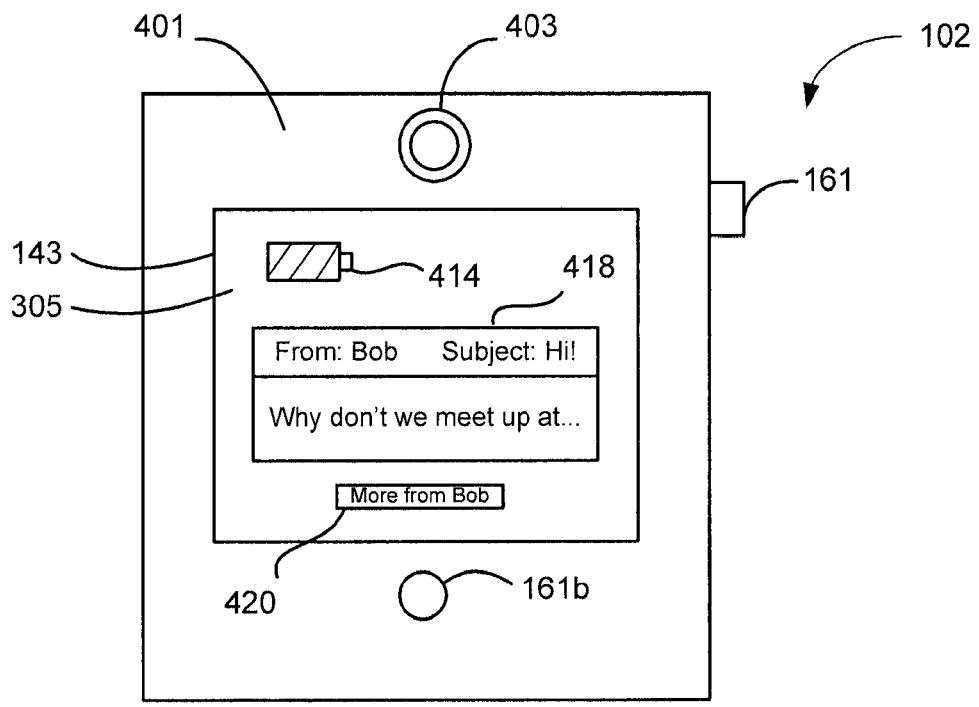
FIG. 5B is a front view illustrating the wireless device of FIG. 5A displaying a preview of an event.

Reference is now made to FIGS. 5A and 5B, which show a front view of another embodiment of a wireless device 102 with the secondary display 143 being visible and active. In FIG. 5A, the secondary display 143 shows an embodiment of the secondary GUI 305 in the base mode. In FIG. 5B, the secondary GUI 305 is in the preview mode. In this embodiment, the secondary GUI 305 may be similar to that described above with reference to FIGS. 4A and 4B, with the addition that the notifications may be associated with certain contacts, and the notification icons 416 may be displayed in association with the respective contact names or contact icons 422. For example, all notification icons 416 associated with one contact (e.g., incoming messages or alerts sent from that contact) are displayed in association with the contact icon 422 for that contact.

As shown in FIG. 5A, in the base mode, there may be one or more contact icons 422 displayed. The contacts for which contact icons 422 are displayed may be chosen by the user, or may be automatically chosen, for example based on the frequency of messages from a certain contact. In this example, contact icons 422 are shown even for contacts having no notifications (e.g., contact "Joe" as shown). In some embodiments, the contact icons 422 for the chosen contacts may be always displayed in the base mode. In some embodiments, the contact icons 422 may be displayed only when there is a notification associated with that contact. In some embodiments, the contact icons 422 are not limited to certain chosen contacts, but may be displayed for all contacts in an address book or a contact history stored in the wireless device 102. The contact icons 422 may include a customizable image, for example a digital photograph. The contact icons 422 may be displayed in a scrollable vertical or horizontal row, as shown. The contact icons 422 may also be displayed in a circular or carousel arrangement. The contact icons 422 may also be displayed one at a time, as the user scrolls through the contacts. Although this embodiment is described with reference to contact icons 422, contact names, numbers, or other representations may be used instead. Although the contact icons 422 are shown having no more than one notification icon 416 associated with each contact icon 422, there may be more than one notification icon 416 associated with each contact icon 422, for example there may be separate notification icons 416 displayed for incoming emails, calendar alerts, and incoming SMS messages. The notification icon 416 may indicate the number of notifications of that type, for example the notification for "Bob" indicates that there are 2 such notifications. Each contact icon 422 may be selected individually using a navigation tool, such as the selection button 161. In the example shown, the contact icon 422 for "Bob" is selected, which may also select a notification associated with "Bob".

FIG. 5B shows a preview mode for this embodiment of the secondary GUI 305. Similar to that described with reference to FIG. 4B, the preview 418 shows information related to an event associated with a notification. The preview 418 may contain applicable information about the event associated with the selected notification, such as the name or number of the sender, a picture, the title or subject of the event, the event type, or a portion of the contents of the event. The preview 418 may include information about or indication of the contact associated with the event. The type and content of the information in the preview 418 may depend on the type of event being previewed, and may be customizable by the user. In the preview mode, the secondary GUI 305 may still include status information such as a battery status 414, or such status information may be obscured by the preview 418. In an embodiment, the user may also be provided with an option to proceed to a preview 418 of an event associated with another notification for the selected contact while remaining in the preview mode, for example by selecting a continue box 420 or by using the navigation tool. Once all events associated with notifications for the selected contact have been previewed, the user may be provided with the option to proceed to a preview 418 of events associated with notifications for another contact, or the secondary GUI 305 may return to the base mode.

Figure 6:
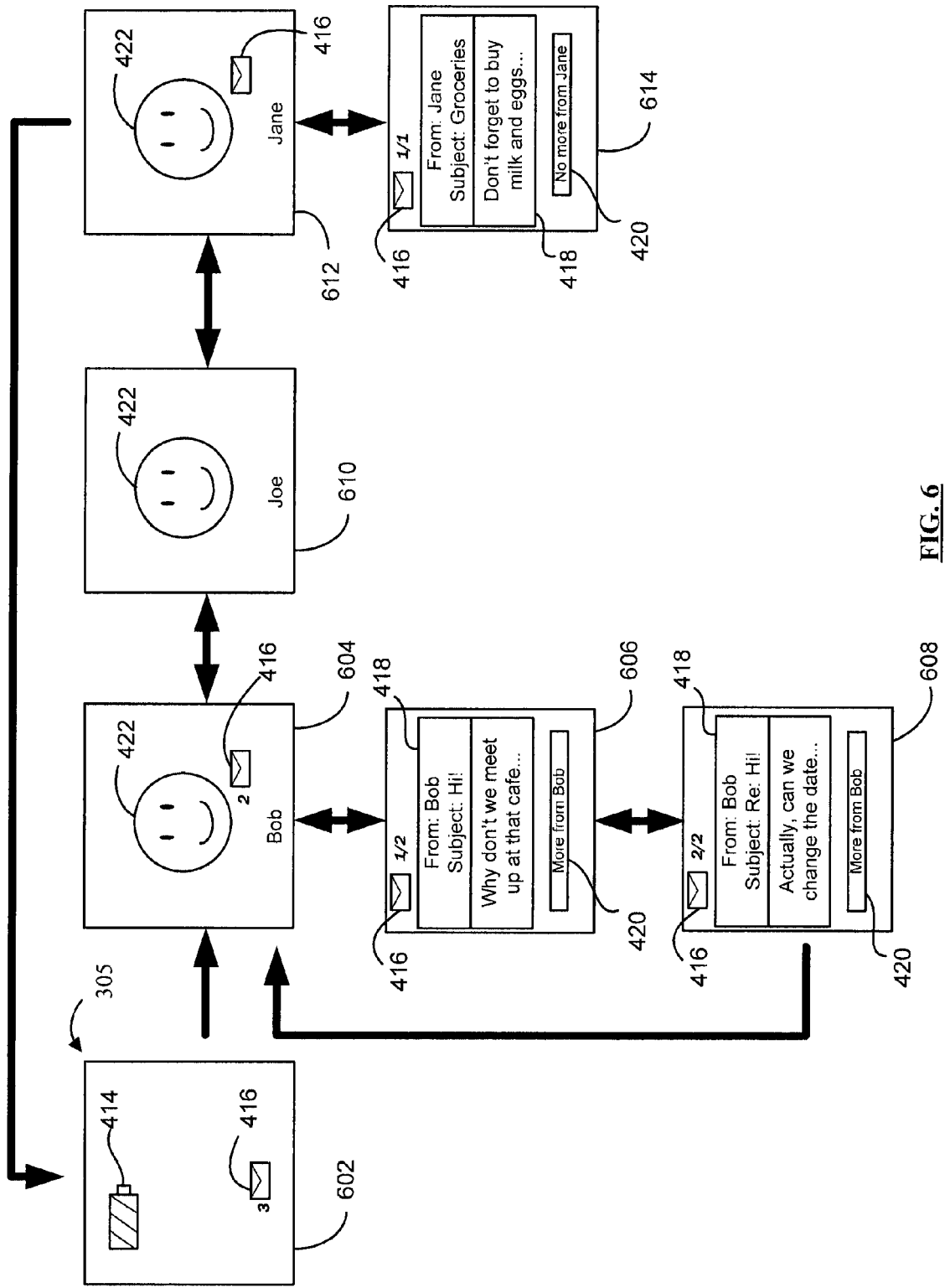
FIG. 6 is a view of a secondary user interface illustrating an example of navigation through notifications in an embodiment.

Reference is next made to FIG. 6, which shows an example of navigating through notifications, in particular where the notifications are associated with respective contacts. For the purpose of simplicity, only the secondary GUI 305 is shown. However, it should be understood that all the other components of the wireless device 102 are still present.

The secondary GUI 305 begins at a view 602, showing the base mode. The base mode in this example includes a general base mode (e.g. as shown in the view 602) which is not specific to any one contact, and a contact-specific base mode which provides information specific to one contact. The secondary GUI 305 in the general base mode may show status information, such as the battery status 414, time/date, coverage bars, network coverage mode (e.g., EDGE or GSM), and notification icons 416. The general base mode may show a plurality of contact icons 422 and their associated notification icons 416, such as shown in FIG. 5A. Alternatively, as shown in FIG. 6, the general base mode may not show the notification icons 416 in association with a contact icon 422. From the view 602, the user may proceed, for example using the selection button 161, to the view 604 of the contact-specific base mode in order to view the notification icons 416 in association with contact icons 422 for specific contacts. As described with respect to FIGS. 5A and 5B, the contacts for which contact icons 422 are displayed may be a subset of all contacts in an address book stored on the wireless device 102, based on user preference or frequency of events from that contact, or may include all contacts in the address book.

The view 604 is still in the base mode, in particular the contact-specific base mode. The secondary GUI 305 now displays a notification icon 416 in association with a contact icon 422, in this particular case, "Bob". The notification icon 416 may be different from that shown in the general base mode, and may indicate only events that are related to the specific contact. For example, the notification icon 416 in the view 602 for the general base mode indicates that there are a total of three notifications, whereas the notification icon 416 in the view 604 for the contact-specific base mode indicates that there are only a total of two notifications associated with "Bob". From the contact-specific base mode, the user may proceed to a preview mode for events associated with notifications from "Bob", such as by selecting a notification using the selection button 161, thus bringing the secondary GUI 305 to a view 606 for the preview mode. Alternatively, selection of a notification may be done simply by pausing on the contact-specific base mode of a certain contact icon 422 for a certain time period, for example 1 second. This time period may be predetermined, and may be selected by the user.

In the view 606, the secondary GUI 305 is in the preview mode, displaying a preview 418 for a first event associated with a notification from "Bob". The notification icon 416 may be displayed in the preview mode, to indicate whether there are other notifications associated with this particular contact. The user may navigate to a preview 418 of an event associated with another notification from this particular contact using the continue box 420. Selection of the continue box 420 brings the secondary GUI 305 to a view 608.

In the view 608, the secondary GUI 305 is in the preview mode, displaying a preview 418 for a second event associated with another notification from "Bob". The view 608 may include the notification icon 416 and the continue box 420, similar to the view 418. The user may be able to navigate between views 606 and 608 while the secondary GUI 305 remains in the preview mode. The OS 302 may bring the secondary GUI 305 back to the base mode, for example in response to user selection using a cancel or selection button 161. As shown, from view 606 or 608 of the preview mode, the user can navigate back to the view 604 of the contact-specific base mode. Alternatively, the OS 302 may return the secondary GUI 305 back to the base mode after a time period, for example 15 seconds, of inactivity in the preview mode. From the preview mode, the secondary GUI 305 may be returned to the contact-specific base mode, such as shown in the view 604, or may return to the general base mode, as shown in the view 602.

From the view 604, the user can also navigate within the contact-specific base mode to other contact icons 422, for example using the selection button. In the example shown, from the view 604 the user can navigate to the contact icon 422 for "Joe", in a view 610. Because there is no notification associated with "Joe", there is no notification icon 416 displayed in the view 610, and the user may not be provided with the ability to navigate to the preview mode from the view 610 of the contact icon 422 for "Joe". However, the user may be able to navigate back to the view 604 showing the contact icon 422 for "Bob" or to a view 612 showing the contact icon 422 for "Jane".

The view 612 of the contact-specific base mode showing the contact icon 422 for "Jane" is similar to the view 604 showing the contact icon 422 for "Bob". The notification icon 416 associated with the contact icon 422 for "Jane" indicates that there is only one notification associated with "Jane". Similar to the view 604, the user may proceed to a view 614 of the preview mode for events associated with notifications from "Jane", for example by using a selection button 161 or by pausing on the view 612 of the contact icon 422 for a certain time period.

The view 614 may be similar to the views 606 and 608 described above. However, because there is only one notification from "Jane", the user may not be able to navigate to a preview 418 of an event associated with another notification from "Jane". As such, the continue box 420 may not be shown, or may be disabled. The OS 302 may return the secondary GUI 305 to the base mode either in response to a selection from the user, or after a certain time period of inactivity in the preview mode as described above.

From the contact-specific base mode, for example as shown in views 604, 610 and 612, the OS 302 may return the secondary GUI 305 to the general base mode, for example as shown in view 602. This may be in response to user selection. The OS 302 may also return the secondary GUI 305 to the general base mode after a time period of inactivity, for example after all events associated with notifications from a specific contact have been previewed.

Although the example shows navigation from the view 602 of the general base mode to the view 604 of the contact-specific base mode for "Bob", it may be equally possible to navigate from the view 602 to the view 610 or the view 612. The specific contact icon 422 that is first shown in the contact-specific base mode and the order in which the contact icons 422 are shown may be based on user preference, the most recently viewed contact icon 422, the contact having the most recent notification, or the contact having the most frequent notifications.

Figure 7:
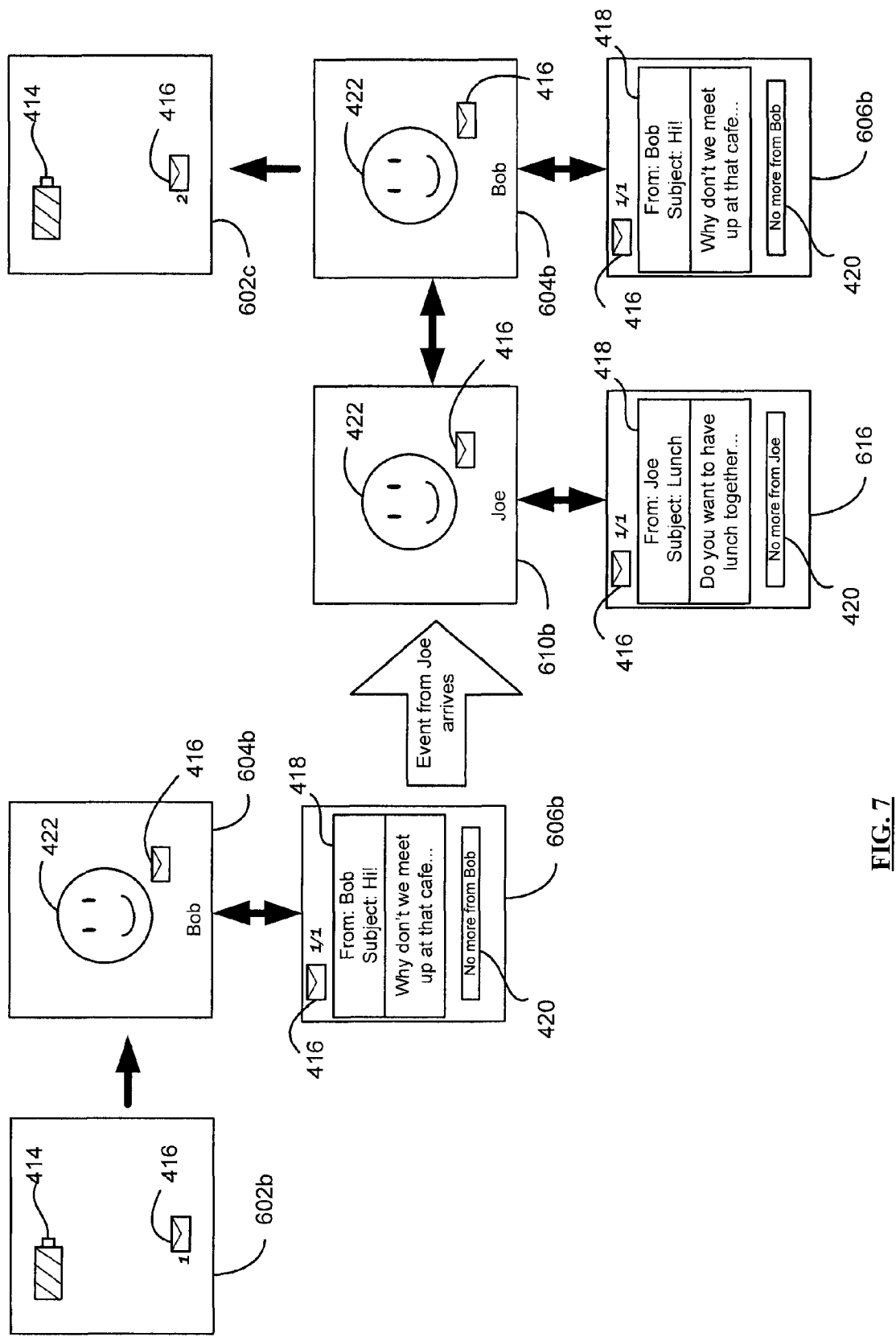
FIG. 7 is a view of the secondary user interface illustrating another example of navigation through notifications using the embodiment of FIG. 6.

Reference is next made to FIG. 7, which shows another example of navigating through notifications. For the purpose of simplicity, only the secondary GUI 305 is shown. However, it should be understood that all the other components of the wireless device 102 are still present. This example describes navigating through notifications in the case where a new notification arrives or is generated while the secondary GUI 305 is in the preview mode.

At the start, there is only one notification, as indicated by the notification icon 416 in the view 602b of the general base mode. As described above with reference to the views of FIG. 6, the user may navigate to the view 604b of the contact-specific base mode and to the view 606 of the preview mode.

While viewing the preview 418 of an event associated with a notification from "Bob", a event may arrive from another contact, for example "Joe", and an associated notification may be generated. The wireless device 102 may signal the new notification to the user, for example using a vibratory or auditory cue.

In response to the new notification from a second contact while the secondary GUI 305 is in the preview mode for a first contact, the OS 302 may allow navigation directly to the contact-specific base mode showing the contact icon 422 for the second contact, for example as shown in the view 610b, without having to return to the contact-specific base mode for the first contact.

From the contact-specific base mode for the second contact, the user may be able to navigate to the preview mode for the new notification, as shown in the view 616. Navigation among the views 602b, 604b, 606b, 610b, and 616 may be similar to that described above with reference to the views of FIG. 6. After arrival of the new event, the notification icon 416 in a view 602c of the general base mode may be updated to indicate that there are now two notifications.

Figure 8:
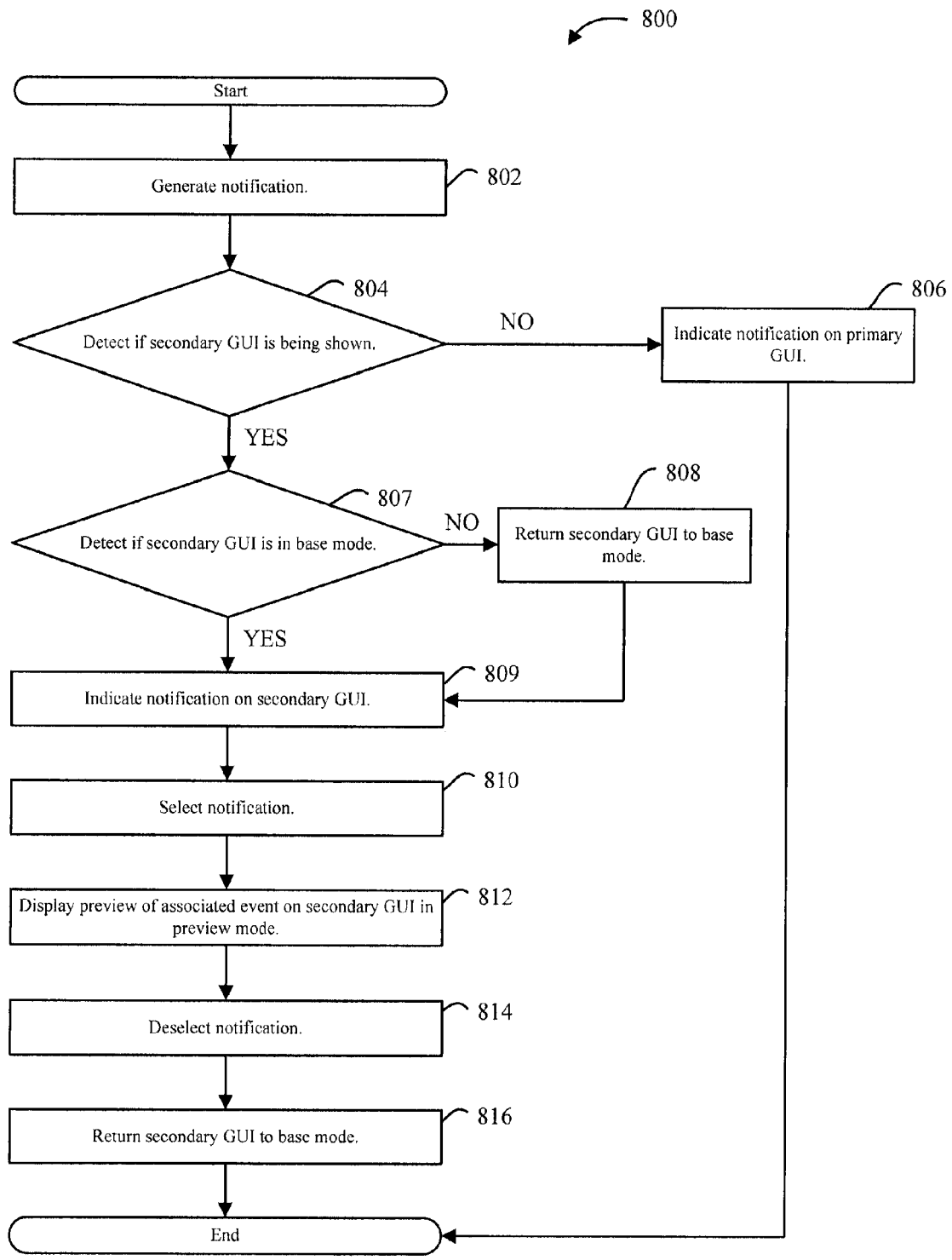
FIG. 8 is a flowchart illustrating a method of navigating through notifications on a wireless device in accordance with an embodiment.

Reference is next made to FIG. 8, which shows a flowchart illustrating a method 800 of navigating through notifications according to an embodiment of the present disclosure.

At a step 802, the wireless device 102 generates or receives a notification associated with an event. The event may be an incoming message, such as an email, a text message, a short message service (SMS) message, a multimedia messaging service (MMS) message, an instant message (IM), a voice mail, or a phone call. The event may also be an alert, such as a calendar event, a task reminder, or an alarm. The notification may be generated by the OS 302 in response to the arrival of the event. The notification handling module 308 notes that the notification is unacknowledged. The notification may be signaled to the user, for example with a vibratory or auditory cue.

At a step 804 the OS 302 detects whether the primary GUI 304 or the secondary GUI 305 is being shown. If the primary GUI 304 is being shown, for example when the wireless device 102 is in the opened configuration and the primary display 142 is active, the method proceeds to a step 806. If the secondary GUI 305 is being shown, for example when the wireless device 102 is in the closed configuration and the secondary display 143 is active, the method proceeds to a step 807.

At the step 806, a notification icon 416 indicating the notification may be displayed on the primary display 142 using the primary GUI 304 and the associated event may be opened or acknowledged using the primary GUI 304.

At the step 807, the OS 302 detects whether the secondary GUI 305 is in the base mode or the preview mode. If the secondary GUI 305 is in the preview mode, for example because the user is looking at a preview 418 of an older event, the method proceeds to a step 808. If the secondary GUI 305 is in the base mode, the method proceeds to a step 809.

At the step 808, the secondary GUI 305 is in the preview mode, showing a preview 418 for an older event. The secondary GUI 305 remains in the preview 418 for the older event until the notification for the older event is deselected, for example after expiration of a certain time period or due to deselection by the user. After deselection, the OS 302 returns the secondary GUI 305 to the base mode. Where the notifications are associated with a contact, the secondary GUI 305 may be brought to the base mode showing the specific contact icon 422 for the contact associated with the notification.

At the step 809, the notification handling module 308 updates the secondary GUI 305 to indicate the notification. This may occur by adding a notification icon 416 to pre-existing notification icons 416 (e.g., where the pre-existing notifications are for a different type of event, the additional notification may have a different icon). Alternatively, the notification handling module 308 may update the secondary GUI 305 by updating a pre-existing notification icon 416 (e.g., increasing a count shown next to the notification icon 416). In an embodiment where notifications are shown associated with a contact, updating the secondary GUI 305 may include displaying a contact icon 422 for the contact associated with the notification, or modifying the contact icon 422 to indicate the additional notification. Although the step 809 is described after the step 808, the secondary GUI 305 may also be updated to indicate the notification in the preview mode if the notification is generated while the secondary GUI 305 is in the preview mode.

At a step 810, the notification is selected. The notification may be automatically selected by the OS 302 for a predetermined time period, for example 5 seconds, without requiring active selection by the user. This predetermined time period may be chosen and set by the user, or may be predetermined in the wireless device 102. This predetermined time period may begin immediately after the notification is generated, such that the notification is selected as soon as it is generated. There may also be a delay after the generation of the notification before this predetermined time period begins, such that the notification may be selected after a delay upon its generation. This delay may be relatively short, for example 2 seconds, and may be predetermined by the user. In the case where the secondary GUI 305 was in the preview mode when the notification was generated, this predetermined time period may begin after the secondary GUI 305 is returned to the base mode, and may include a delay as described above.

The user may also navigate among one or more notifications using the secondary GUI 305 and select a notification using a navigation tool such as the selection button 161 or the secondary trackball 161b. Selection of a notification may simply occur by the user pausing on the respective notification icon 416 or contact icon 422 for a few seconds, or may require the user to make an active selection, for example using the selection button 161. The notification handling module 308 does not consider selection of a notification to be acknowledgement of the notification. As a result, the notification is still maintained, that is, the selected notification is not dismissed. This prevents unintentional dismissal of a notification due to unintentional selection, for example if the wireless device 102 is jostled inside a pocket or a purse. In some embodiments, the user may not be provided with an option to acknowledge or dismiss notifications using the secondary GUI 305, such that the notification is maintained regardless of any user interaction with the secondary GUI 305.

At a step 812, a preview of the event associated with the selected notification is displayed on the secondary GUI 305 in the preview mode. The preview may contain applicable information about the event, such as the name or number of the sender, a picture, the title or subject of the event, the event type, or a portion of the contents of the event. The OS 302 may cause the secondary GUI 305 to switch back and forth between displaying just the notification icon 416 and the preview 418, either automatically, or based on user selection, for example using the selection button 161.

At a step 814, the notification is deselected. This may be due to the expiration of the predetermined time period. The user may also be provided with the option of deselecting the notification before the expiration of the predetermined time period, for example by pressing the selection button 161. In some embodiments, if the user interacts with the preview 418 at the step 812, for example by scrolling through the preview 418, the notification may not be deselected unless the user actively deselects the notification. This may avoid the OS 302 bringing the secondary GUI 305 back to the base mode while the user is still reading the preview 418.

The notification may also be deselected only in response to user input (e.g., by pressing a cancel or selection button 161), rather than based on a predetermined time period.

The user may also navigate to a preview 418 of an event associated with another notification while remaining within the preview mode, which would result in deselection of the originally selected notification and selection of the other notification. Navigation through the notifications may be presented to the user in chronological order (e.g., the notifications are ordered such that the more recent notifications are selected first). In an embodiment where notifications are associated with respective contacts, the user may be limited to navigating among notifications for the selected contact and would have to return to the base mode to select another contact. Alternatively, the user may be able to navigate among notifications associated with all contacts while remaining within the preview mode, but the notifications may be grouped by contact.

At a step 816, after the notification is deselected, the OS 302 returns the secondary GUI 305 to the base mode. The notification associated with the previewed event remains unacknowledged and the notification is still indicated on the secondary GUI 305.

In some embodiments, an event that has been read or acknowledged may be marked or flagged by the user so that an associated notification is re-generated and/or re-displayed on the secondary GUI 305 even though the event has already been read or acknowledged on either the primary GUI 304 or secondary GUI 305. This may allow the user to use notifications for acknowledged events as event reminders to deal with the event later or as an action item. For example, a user may receive an email message that has to be dealt with at a later time. After reading the email, the user may mark or flag the email message so that a notification associated with that email message is re-generated or re-displayed at the later time and is displayed on the secondary GUI 305, as an event reminder to the user. The later notification may be the same notification that was generated when the event first arrived, or it may be a different notification. Marking or flagging of the event may be done by the user on the primary GUI 304, and may be done immediately after the event is acknowledged (e.g., immediately after opening an email message) or may be done at a later time. When the event is marked or flagged for re-generating or re-displaying a notification, the user may choose different options for the notification, such as different icons, logos, colors, sounds (e.g., an auditory cue), or text (e.g., colored or fonted text). Although this has been described with respect to an email message, it will be understood that re-generation or re-display of a notification as an event reminder may also apply to notifications associated with other events discussed above.

In the method 800, the selection button 161 may not be needed for selecting and deselecting the notification. The selection button 161 may instead provide other functions, such as volume control or camera control.

While the steps of the method 800 are shown as occurring in a particular order, it will be appreciated by those skilled in the art that many of the steps are interchangeable and may occur in different orders than that shown without materially affecting the end results of the method 800. Additionally, while notification handling is described as principally occurring within the notification handling module 308, it will be understood by those skilled in the art that a module or modules similar to the notification handling module 308 may be implemented as part of the other software modules on the wireless device, or each software application module may have its own notification handling sub-module to handle notifications relating to that application. The steps described may be carried out by a single module or may be carried out by several different modules. While the secondary GUI 305 is described as having a base mode and a preview mode, it will be understood that the present disclosure can be carried out without using these specific distinct modes.

While the present disclosure refers to a the use of a clickable thumbwheel 160, a trackball 160b, a selection button 161, a secondary trackball 161b, a keyboard 154, an input device, or similar navigation and input mechanisms for navigation on a wireless device 102, it will be appreciated by those skilled in the art that navigation, input or both may be provided by the use of a touchscreen display. The primary display 142, secondary display 143 or both may be a touchscreen display. Navigation or input on a touchscreen display may be by contacting the display directly with fingers, or by using a stylus or a similar pointing device.

While the present disclosure is primarily described as a method, a person of ordinary skill in the art will understand that the present disclosure is also directed to an apparatus for carrying out the disclosed method and including apparatus parts for performing each described method step, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A method for navigating through notifications on a wireless device having a primary user interface shown on a primary display and a secondary user interface shown on a secondary display, the method comprising:
generating a notification at the wireless device, the notification being associated with an event;
detecting if the secondary user interface is active;
indicating the notification on the secondary user interface if the secondary user interface is active, wherein the notification includes one of: an icon, a logo, colored text, and fonted text, wherein the secondary display displays identifiers of a plurality of users, wherein indicating the notification further comprises indicating the identifier of one of the plurality of users on the secondary display as a user associated with the event;
displaying a preview of the event on the secondary user interface in a preview mode, in response to detection of a selection of the notification, the preview mode providing a portion of but not all of event contents; and
closing the preview of the event on the secondary user interface in response to detection of a deselection of the notification to bring the secondary user interface out of the preview mode;
wherein the same notification is maintained on the secondary user interface after closing the preview of the associated event.

2. The method of claim 1 wherein if the secondary user interface is displaying a preview of an older event when a notification of a newer event is generated, then the preview of the newer event is displayed after notification of the older event is deselected.

3. The method of claim 1 wherein the wireless device selects the notification for a predetermined time period after generating the notification and the wireless device deselects the notification when the predetermined time period expires.

4. The method of claim 1 wherein the event is associated with a contact and the notification is displayed in association with the contact.

5. The method of claim 1 wherein the preview includes information selected from the group consisting of: a sender name, a sender number, a picture, an event title, a message subject, an event type, and at least a portion of event contents.

6. The method of claim 1 further comprising signaling generation of the notification to the user using a vibratory cue or an auditory cue.

7. The method of claim 1 wherein there is a plurality of notifications, further comprising:
displaying a preview of an event associated with a first notification on the secondary user interface in the preview mode;
providing an option to navigate from the preview of the event associated with the first notification to a preview of an event for a second notification;
deselecting the first notification and selecting the second notification if the option is selected, the secondary user interface being maintained in the preview mode; and
displaying the preview of the event associated with the second notification on the secondary user interface in the preview mode.

8. The method of claim 7 wherein the events are associated with respective contacts, and an option is provided to navigate among previews of events associated with a single contact while the secondary user interface is maintained in the preview mode.

9. The method of claim 1 wherein the associated event is selected from the group consisting of: an incoming email, an incoming text message, an incoming short message service message, an incoming multimedia messaging service message, an incoming instant message, an incoming voice mail, an incoming phone call, a calendar event, a task reminder, or an alarm.

10. The method of claim 1, further comprising indicating on the secondary display, concurrent with the identifier of the user associated with the event, the identifier of a second of the plurality of users as a user associated with a second notification associated with a second event.

11. The method of claim 1, wherein, concurrent with indicating the identifier of the user associated with the event, at least one identifier of the plurality of users is not indicated as a user associated with any event notification.

12. The method of claim 1, wherein the identifiers of the plurality of users are obtained from an address book of the wireless device.

13. A wireless device for navigating through notifications, the wireless device comprising:
a microprocessor for controlling the operation of the wireless device;
a first input device coupled to the microprocessor for accepting an input;
a first display device for showing a primary user interface and a second display device for showing a secondary user interface, the first display device and the second display device being coupled to the microprocessor for communicating an output to the user;
a communications subsystem coupled to the microprocessor for communicating with a communications network;
a memory coupled to the microprocessor; and
a storage device coupled to the microprocessor;
the wireless device including a notification handling module resident in the memory for execution by the microprocessor, the notification handling module being configured to:
generate a notification at the wireless device, the notification being associated with an event;
detect if the secondary user interface is active;
indicate the notification on the secondary user interface if the secondary user interface is active, wherein the notification includes one of: an icon, a logo, colored text, and fonted text, wherein the secondary display displays identifiers of a plurality of users, wherein indicating the notification further comprises indicating the identifier of one of the plurality of users on the secondary display as a user associated with the event;
display a preview of the event on the secondary user interface in a preview mode, in response to detection of a selection of the notification, the preview mode providing a portion of but not all of event contents; and
close the preview of the event on the secondary user interface in response to detection of a deselection of the notification to bring the secondary user interface out of the preview mode;
wherein the same notification is maintained on the secondary user interface after closing the preview of the associated event.

14. The wireless device of claim 13 wherein if the secondary user interface is displaying a preview of an older event when a notification of a newer event is generated, then the preview of the newer event is displayed after notification of the older event is deselected.

15. The wireless device of claim 13 wherein the wireless device selects the notification for a predetermined time period after generating the notification and the wireless device deselects the notification when the predetermined time period expires.

16. The wireless device of claim 13 wherein the event is associated with a contact and the notification is displayed in association with the contact.

17. The wireless device of claim 13 wherein the preview includes information selected from the group consisting of: a sender name, a sender number, a picture, an event title, a message subject, an event type, and at least a portion of event contents.

18. The wireless device of claim 13 wherein the notification handling module is further configured to signal generation of the notification to the user using a vibratory cue or an auditory cue.

19. The wireless device of claim 13 wherein there is a plurality of notifications, and the notification handling module is further configured to:
display a preview of an event associated with a first notification on the secondary user interface in the preview mode;
provide an option to navigate from the preview of the event associated with the first notification to a preview of an event for a second notification;
deselect the first notification and select the second notification if the option is selected, the secondary user interface being maintained in the preview mode; and
display the preview of the event associated with the second notification on the secondary user interface in the preview mode.

20. The wireless device of claim 19 wherein the events are associated with respective contacts, and an option is provided to navigate among previews for events associated with a single contact while the secondary user interface is maintained in the preview mode.

21. The wireless device of claim 13 wherein the associated event is selected from the group consisting of: an incoming email, an incoming text message, an incoming short message service message, an incoming multimedia messaging service message, an incoming instant message, an incoming voice mail, an incoming phone call, a calendar event, a task reminder, or an alarm.

22. A computer program product having a computer readable medium tangibly embodying code for navigating through notifications in a mobile communication device, the device having a primary user interface shown on a primary display and a secondary user interface shown on a secondary display, the computer program product comprising:
code for generating a notification at the wireless device, the notification being associated with an event;
code for detecting if the secondary user interface is active;
code for indicating the notification on the secondary user interface if the secondary user interface is active, wherein the notification includes one of: an icon, a logo, colored text, and fonted text, wherein the secondary display displays identifiers of a plurality of users, wherein indicating the notification further comprises indicating the identifier of one of the plurality of users on the secondary display as a user associated with the event;
code for displaying a preview of the event on the secondary user interface in a preview mode, in response to detection of a selection of the notification, the preview mode providing a portion of but not all of event contents; and
code for closing the preview of the event on the secondary user interface in response to detection of a deselection of the notification to bring the secondary user interface out of the preview mode;
wherein the same notification is maintained on the secondary user interface after closing the preview of the associated event.

23. A method of handling a notification on a wireless device having a primary user interface shown on a primary display and a secondary user interface shown on a secondary display, the method comprising:
generating a notification at the wireless device, the notification being associated with an event;
displaying the notification on the primary or secondary user interface, wherein the notification includes one of: an icon, a logo, colored text, and fonted text;
dismissing the notification after acknowledgement of the event;
receiving input instructions for flagging the notification for an event reminder at a later time; and
redisplaying the same notification on the secondary user interface as the event reminder at said later time in response to the flagging, wherein the secondary display displays identifiers of a plurality of users, wherein redisplaying the notification further comprises indicating the identifier of one of the plurality of users on the secondary display as a user associated with the event.

24. The method of claim 23 wherein the event reminder is shown on the secondary user interface until deactivation by the user or the device.

25. The method of claim 24 wherein the deactivation comprises acknowledgement of viewing the event reminder.

26. The method of claim 23 wherein the event reminder further comprises an audible cue.

* * * * *